United States Patent
Becker et al.

(10) Patent No.: US 7,620,100 B2
(45) Date of Patent: *Nov. 17, 2009

(54) METHOD AND APPARATUS FOR EQUALIZATION OF A SIGNAL WHICH IS TRANSMITTED VIA A USER CHANNEL USING THE DF METHOD, AND TAKING INTO ACCOUNT AN INTERFERENCE CHANNEL

(75) Inventors: Burkhard Becker, Ismaning (DE); Bertram Gunzelmann, Königsbrunn (DE); Martin Krueger, Munich (DE); Xiaofeng Wu, Neubiberg (DE)

(73) Assignee: Infineon Technologies AG, Munich (DE)

( * ) Notice: Subject to any disclaimer, the term of this patent is extended or adjusted under 35 U.S.C. 154(b) by 849 days.

This patent is subject to a terminal disclaimer.

(21) Appl. No.: 10/850,745

(22) Filed: May 21, 2004

(65) Prior Publication Data
US 2005/0025272 A1 Feb. 3, 2005

(30) Foreign Application Priority Data
May 23, 2003 (DE) ............................... 103 23 407

(51) Int. Cl.
*H03H 7/30* (2006.01)

(52) U.S. Cl. .................................................. 375/233
(58) Field of Classification Search ................. 375/233, 375/262, 265, 341, 285, 232, 346–350; 704/242; 714/792, 795; 370/342
See application file for complete search history.

(56) References Cited

U.S. PATENT DOCUMENTS

| 7,035,317 B2* | 4/2006 | Elezabi et al. ............... 375/148 |
| 2003/0063681 A1* | 4/2003 | Olivier ........................ 375/265 |
| 2004/0202231 A1* | 10/2004 | Wang et al. .................. 375/148 |

OTHER PUBLICATIONS

Mahadevappa et al. Mitigating Multiple Access Interference and Intersymbol Interference in Uncoded CDMA Systems With Chip-Level Interleaving, 2002 IEEE, p. 781-792.*
"Equalisation Techniques for Coded Modulation", J. Paul Thorlby, 1997, York, Thesis, Department of Electronics, University of York, 14 pgs.

* cited by examiner

*Primary Examiner*—Sam K Ahn
(74) *Attorney, Agent, or Firm*—Eschweiler & Associates, LLC

(57) ABSTRACT

In a method for equalization of a signal that is transmitted via a user channel using the DF method, an interference channel is taken into account by the DF contribution that is used for processing of the user channel trellis diagram containing information about the interference channel.

14 Claims, 7 Drawing Sheets

METHOD AND APPARATUS FOR EQUALIZATION OF A SIGNAL WHICH IS TRANSMITTED VIA A USER CHANNEL USING THE DF METHOD, AND TAKING INTO ACCOUNT AN INTERFERENCE CHANNEL

REFERENCE TO RELATED APPLICATIONS

This application claims the benefit of the priority date of German application DE 103 23 407.1, filed on May 23, 2003, the contents of which are herein incorporated by reference in their entirety.

FIELD OF THE INVENTION

The invention relates to a method for equalization of a signal that is transmitted via a user channel using the DF (Decision Feedback) method, and taking into account an interference channel.

BACKGROUND OF THE INVENTION

When radio signals are being transmitted between a transmitter and a receiver, various interference influences occur which have to be taken into account during the receiver-end signal detection. Firstly, the signal is subject to distortion which is caused by there generally being two or more possible signal propagation paths. Owing to reflection, scatter and diffraction of signal waves on obstructions, such as buildings, mountains and the like, the reception field strength at the receiver is composed of a number of signal components, which generally have different strengths and different delays. This phenomenon, which is referred to as multipath propagation, causes the distortion of the transmitted data signal that is known as intersymbol interference (ISI).

Other active subscribers represent a further cause of interference. The interference that is caused by these subscribers is referred to as multiple access interference (MAI). One scenario that occurs frequently actually involves a dominant interference source or interference channel having a serious adverse effect on the signal detection in the user channel.

Figure 1:
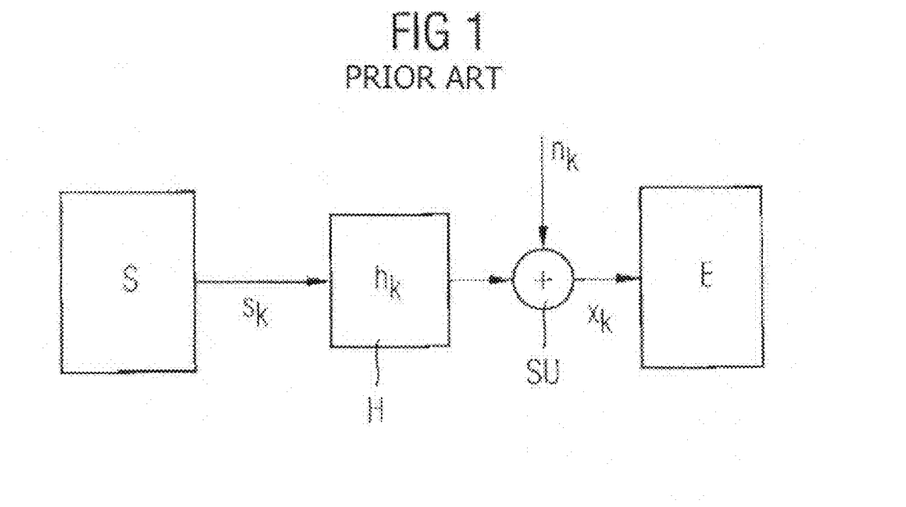
FIG. 1 shows a schematic illustration of a model of the physical transmission channel.

First of all, only one channel will be considered, that is to say MAI will be ignored. This multipath transmission channel between the transmitter S and the receiver E can be modeled as a transmission filter H with channel coefficients $h_k$, as is illustrated in FIG. 1. The transmitter S feeds transmission symbols $s_k$ into the transmission channel, that is to say the channel model transmission filter H. An additive noise contribution $n_k$ can be taken into account by means of a model adder SU, and is added to the transmission symbols $s_k$ (filtered by means of $h_k$) at the output of the channel model transmission filter H.

The index k denotes the discrete time in time units of the symbol clock rate. The transmission signals $s_k$ which have been filtered by means of the transmission filter H and on which noise is superimposed are received as the received signal $x_k$ by the receiver E, such that:

$$x_k = \sum_{i=0}^{L} h_i s_{k-i} + n_k \quad (1)$$

where L represents the order of the transmission channel that is modeled by the filter H. As can be seen from equation 1, ISI is present since $x_k$ depends not only on $s_k$ but also on $s_{k-1}, \ldots, s_{k-L}$.

Figure 2:
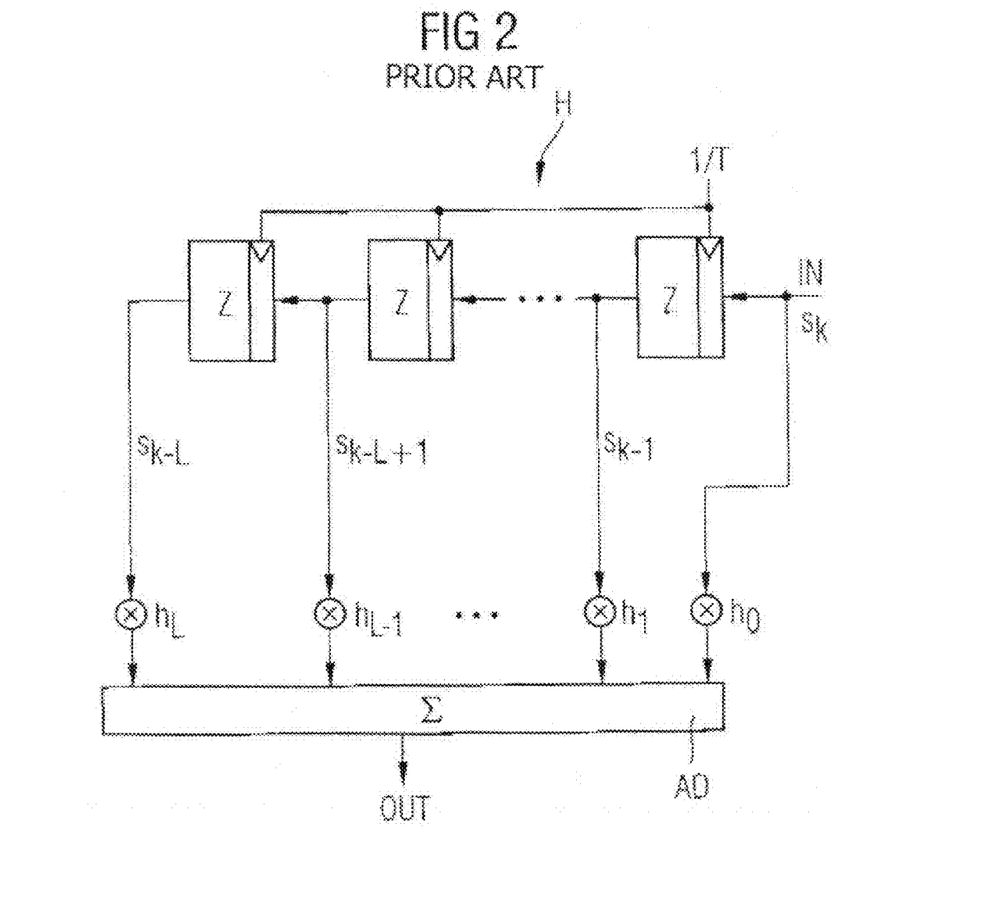
FIG. 2 shows the configuration of a model filter for modeling of a transmission channel.

FIG. 2 shows the channel model transmission filter H. The filter H comprises a shift register comprising L memory cells Z. Taps (a total of L+1) are in each case located before and behind each memory cell Z and lead to multipliers which multiply the values of the symbols $s_k, s_{k-1}, \ldots, s_{k-L}$ (which have been inserted into the shift register via an input IN at the symbol clock rate $T^{-1}$) by the corresponding channel impulse responses $h_0, h_1, \ldots, h_L$. An output stage AD of the filter H adds the outputs from the L+1 multipliers. This thus results in an output signal OUT corresponding to equation 1.

The state of the channel is described by the memory contents of the channel model shift register. The memory contents of the first memory cell on the input side contain the symbol $s_{k-1}$ (which is multiplied by $h_1$) in the time unit k, and the further memory cells Z are filled with the symbols $s_{k-2}, s_{k-3}, \ldots, s_{k-L}$. The state of the channel in the time unit k is thus determined uniquely by the details of the memory contents, that is to say by the L-tuple $(s_{k-L}, s_{k-L+1}, \ldots, s_{k-1})$.

In the receiver E, the received signal values $x_k$ are known as sample values, and the channel impulse responses $h_0, h_1, \ldots, h_L$ of the channel are estimated at regular time intervals. The object of the equalization process is to calculate the transmission symbols $s_k$ from this information. Equalization by means of a Viterbi equalizer will be considered in the following text.

Viterbi equalization is based on finding the shortest path through a state diagram of the channel, which is known as a trellis diagram. The channel states are plotted against the discrete time k in the trellis diagram. According to the Viterbi algorithm (VA), a branch metric is calculated for each possible transition between two states (previous state relating to the time unit k→target state relating to the time unit k+1), and represents a measure of the probability of that transition. The branch metrics are then added to the respective state metrics (also frequently referred to as path metrics in the literature) of the previous states. In the case of transitions to the same final state, the sums obtained in this way are compared. That transition to the final state in question whose sum of the branch metric and the state metric of the previous state is a minimum is selected and forms the extension of the path leading to this previous state to the target state. These three fundamental VA operations are known as ACS (ADD-COMPARE-SELECT) operations.

Now, from the combinational point of view, the number of paths through the trellis diagram increases exponentially as k rises (that is to say as time passes), it remains constant for the VA. The reason for this is the selection step (SELECT). Only the selected path (the survivor) survives and can be continued. The other possible paths are rejected. Recursive path rejection is the core concept of the VA and is an essential precondition for the use of computation to solve the problem of searching for the shortest path (also referred to as the "best path") through the trellis diagram.

The number of channel states (that is to say the number of possible ways in which the shift register H may be occupied) in the trellis diagram, which is identical to the number of paths followed through the trellis diagram, is $m^L$. In this case, m denotes the significance of the data symbols being considered. The computation complexity of the VA accordingly increases exponentially with L. Since L should correspond to the length of the channel memory of the physical propagation channel, the complexity for processing the trellis diagram increases as the channel memory of the physical propagation channel rises.

One simple method to reduce the computation complexity is to base the trellis processing on a short channel memory L of, for example, three or four time units (taps). However, this has a severe adverse effect on the performance of the equalizer. A considerably more sensible measure for limiting the computation complexity, which does not have a serious influence on the quality of the equalizer, is the decision feedback (DF) method. In the case of the DF method, the VA is based on a reduced trellis diagram, that is to say a trellis diagram in which only some of the $m^L$ channel states are considered rather than all of them. If the trellis diagram is reduced to $m^{L_{DF}}$ trellis states ($L_{DF}$<L), the remaining L-$L_{DF}$ channel coefficients (which are not used for the definition of trellis states) are still taken into account by being used for the calculation of the branch metrics in the reduced trellis diagram.

A branch metric must be calculated for each possible transition between two states both during the processing of the complete trellis diagram and during the processing of the reduced trellis diagram (DF case). The branch metric is the Euclidean distance between the measured signal value or sample value $x_k$ and a reconstructed "hypothetical" signal value which is calculated and "tested" with respect to the target state, the transition from the previous state to the target state and the path history, taking into account the channel knowledge in the receiver:

By way of example, let us assume that m=2 (a binary data signal), that is to say there are $2^L$ (DF case: $2^{L_{DF}}$) trellis states $(0, 0, \ldots, 0), (1, 0, \ldots, 0)$ to $(1, 1, \ldots, 1)$ comprising L tuples (DF: $L_{DF}$ tuples). One specific hypothetical previous state is assumed to be defined by the shift register occupancy ($a_L$, $a_{L-1}, \ldots, a_1$) (in the DF case, only the $L_{DF}$ right-hand bits ($a_{L_{DF}}, \ldots, a_1$) of the shift register occupancy are used for the state definition). The hypothetically transmitted symbol (bit) 0 or 1 is denoted by $a_0$, and changes the previous state ($a_L$, $a_{L-1}, \ldots, a_1$) in the time step k to the target state ($a_{L-1}$, $a_{L-2}, \ldots, a_0$) in the time step k+1 (DF: previous state ($a_{L_{DF}}, \ldots, a_1$) to the target state ($a_{L_{DF}-1}, \ldots, a_0$). The branch metric $BM_k$, with or without DF, is:

$$BM_k = |\text{sample value} - \text{reconstructed signal value}|^2 \quad (2)$$

$$= \left| x_k - \left( \sum_{i=1}^{L} h_i(1 - 2 \cdot a_i) + h_0(1 - 2 \cdot a_0) \right) \right|^2 \text{ for } a_i = \{0, 1\}$$

The reconstructed signal value (also referred to in the following text as the reconstructed symbol) is a sum of products of a channel coefficient and a symbol. For the DF case, the term $$\sum_{i=1}^{L} h_i(1 - 2 \cdot a_i)$$

may also be split into a trellis contribution and a DF contribution:

$$BM_k = \quad (3)$$

$$\left| x_k - \left( \underbrace{\sum_{i=L_{pr}+1}^{L} h_i(1 - 2 \cdot a_i)}_{\text{DF contribution}} + \underbrace{\sum_{i=1}^{L_{pr}} h_i(1 - 2 \cdot a_i)}_{\text{trellis contribution}} + \underbrace{h_0(1 - 2 \cdot a_0)}_{\substack{\text{hypothetical symbol} \\ \text{contribution}}} \right) \right|^2$$

This means that the reconstructed symbol comprises two (DF case: three) contributions: a contribution which is governed by the hypothetically transmitted symbol $a_0$ for the transition from the time unit k to the time unit k+1, the trellis contribution, which is given by the previous state relating to the time unit k in the trellis diagram, and, in the DF case, the DF contribution as well, owing to the reduced trellis states.

The branch metric $BM_k$ is always the same, with or without DF. As already mentioned, the computation saving in the case of the VA with DF results from the smaller number $2^{L_{DF}}$ of trellis states to be taken into account during the processing of the trellis diagram, that is to say the reduction in the trellis diagram.

If it is also intended to take into account an interference channel (that is to say a second multipath transmission channel) in the equalization of a data signal, joint VA equalization must be carried out for the two channels (the user channel and the interference channel). This is done by forming an overall trellis diagram which includes the states of both channels: one example, if m=2 (binary data signal) and L=4 for both channels, the trellis diagram for the user channel comprises 16 states, and the trellis diagram for the interference channel likewise comprises 16 states. The "combinational" overall trellis diagram on which the joint VA equalization of the two signals is based then comprises 16×16=256 states. If one additional DF bit is in each case taken into account (that is to say L=5, $L_{DF}$=4), the overall trellis diagram still comprises 256 states, but another two DF bits are added as the DF contribution to the calculation of the branch metrics.

The complexity for processing the overall trellis diagram is increased by a factor of 16 in comparison to the complexity for processing the trellis diagram for the user channel.

SUMMARY OF THE INVENTION

The invention is based on the object of specifying a method which involves less complexity for equalization of a signal which is transmitted via a user channel using the DF method, and taking into account an interference channel. A further aim is to provide an equalizer with this characteristic.

The basic idea of the invention accordingly comprises using (only) the trellis diagram for the user channel as the basis for equalization of a signal which is transmitted via a user channel and which uses the DF method for equalization, and of taking account of the influence of the interference channel (only) in the DF contribution of the DF equalization. In other words, the interference channel is completely ignored in the definition of the states of the "combinational" overall channel. The interference channel is taken into account solely by means of the DF contribution—that is to say it is done analogously to user channel symbols that occurred more than $L_{DF}$ previously. The information about the interference channel is thus included in the calculation of the branch metric values, but does not influence the processing of the trellis diagram, which is done in precisely the same way as if there were no interference channel or as if no interference channel needed to be taken into account.

The advantage of the method according to the invention can be explained most easily with reference to the example described above: if 16 trellis states need to be processed for m=2 in each time unit (that is to say $L_{DF}$=4), the complexity with respect to the processing of the trellis diagram (in comparison to the processing of the overall trellis diagram with 256 states) is reduced by a factor of 16. Additional complexity is incurred (in comparison to equalization of the user channel without taking the interference channel into account) only for the calculation of the information about the interference channel that is contained in the DF contribution.

The DF contribution preferably also contains information about the user channel, that is to say it takes account of symbols which were received further back in time with respect to the user channel and which are not included in the definition of the trellis diagram for the user channel. This measure further improves the equalization of the user channel, intrinsically corresponding to the already known DF method.

In order to calculate the information about the interference channel for the DF contribution, Viterbi equalization is advantageously carried out by processing a trellis diagram for the interference channel. This means that the trellis diagram for the equalization of the interference channel is based only on the states that define the interference channel. If, according to the above example (m=2), the Viterbi equalization of the interference channel is likewise carried out by means of a trellis diagram (for the interference channel) with 16 states, two trellis diagrams, each having 16 states, must be processed for each time unit. In comparison to the processing of an overall trellis diagram with 256 states according to the prior art, this results in a complexity saving by a factor of 8.

A DF equalizer according to the invention, which is designed to carry out the equalization method according to the invention, preferably has a hardware calculation circuit for calculation of branch metric values taking into account DF contributions and which is designed not only to calculate the branch metric values for the processing of the trellis diagram for the user channel, but also to calculate the branch metric values for the processing of the trellis diagram for the interference channel. The hardware calculation circuit is thus used alternately for the calculation of branch metric values for VA equalization of the user channel, and for VA equalization of the interference channel. The advantage is that a single hardware calculation circuit, as is described in German Patent Application DE 103 03 954 (which is hereby incorporated by reference in its entirety), can be used for calculation of branch metric values for the two channels "alternately".

BRIEF DESCRIPTION OF THE DRAWINGS

The invention will be explained in the following text using an exemplary embodiment and with reference to the drawings, in which.

DETAILED DESCRIPTION OF THE INVENTION

Without any restriction to generality, the case where m=2 will be considered by way of example in the following text. A two-value symbol alphabet is used, for example, in the GSM mobile radio standard. Furthermore, a channel model filter H as shown in FIG. 2 and which contains L=5 memory cells will be used as the basis, likewise by way of example, for the equalization of the interference channel and of the user channel. In order to restrict the complexity for processing the trellis diagram, the DF method is used, to be precise in such a manner that each state in the trellis diagram is defined by 4 bits ($L_{DF}$=4). In consequence, the trellis diagram for both the interference channel and the user channel has $2^4$=16 states in each case for the present example.

Figure 3:
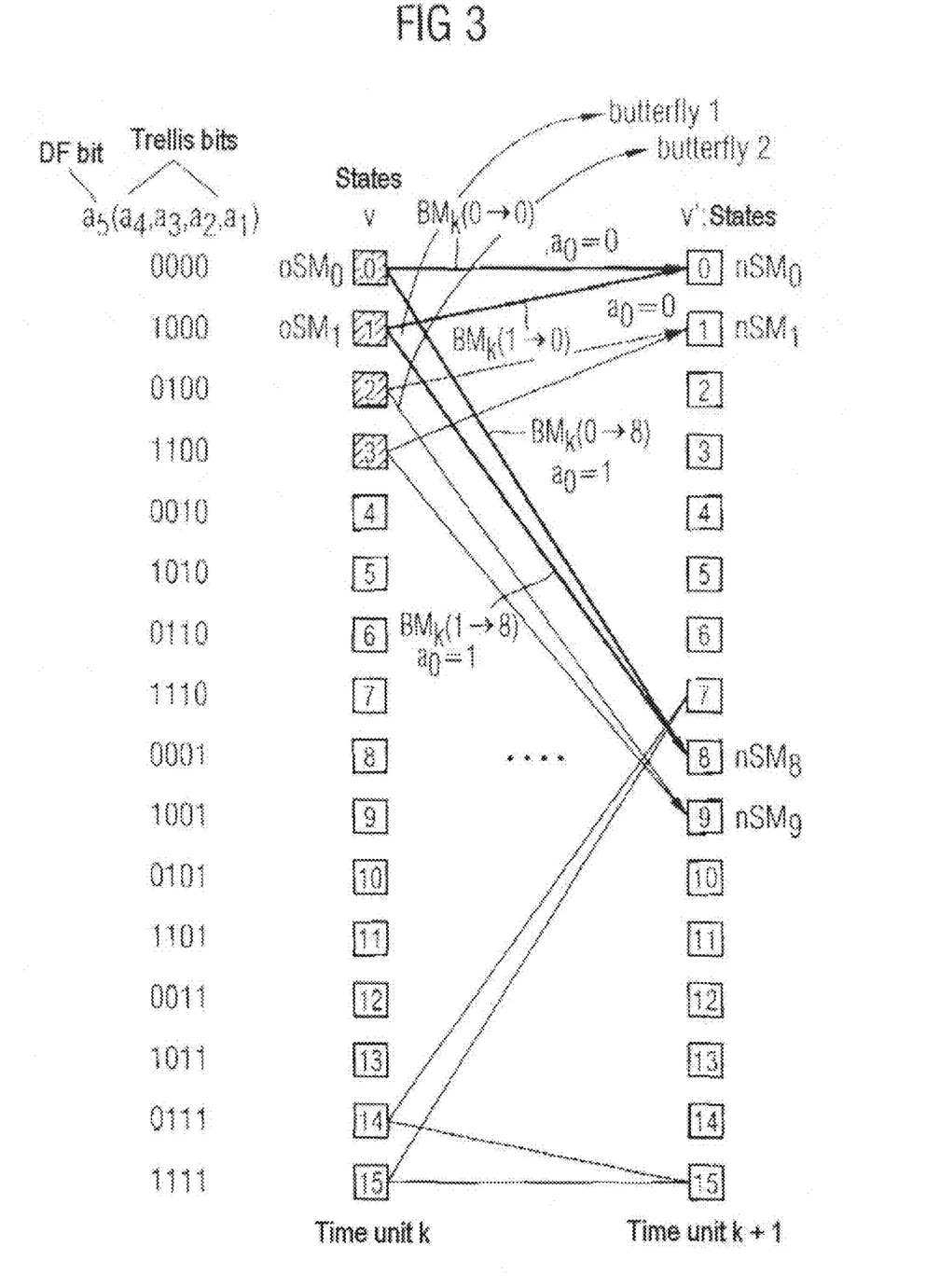
FIG. 3 shows a detail from a trellis diagram for two time units k and k+1 for L=5 and $L_{DF}$=4 with respect to one channel.

FIG. 3 shows a detail (time unit k and time unit k+1) from the associated trellis diagram (which applies both to the user channel and to the interference channel) with 16 states. First of all, the processing of a trellis diagram such as this will be explained in a general form, without going into the consideration of the other (second) channel according to the invention. The states are denoted by the index v, and are represented by the small boxes, numbered successively from 0 to 15, above the time units k and k+1. The first 4 memory cells in the model filter H in each time unit may thus assume one of 16 possible channel states.

The ACS operations relating to the time unit k are assumed to have already been carried out. A state metric will then already have been calculated for each of the 16 states for the time unit k. Furthermore, the path that leads to each of these states (sequence of previous states) is defined. The "old" state metric value calculated for the state v, v=0, ..., 15 in the time unit k is referred to in the following text as $oSM_v$.

The object of the ACS operation is to calculate a new state metric value for each target state v' in the time unit k+1. The new state metric values which are calculated for the target states in the time unit k+1 are denoted $nSM_{v'}$, v'=0, ..., 15.

The new state metric values for the target states are calculated using the known VA, as follows:

First of all, let us consider the target state v'=0. With the value of the hypothetical bit $a_0$=0, the target state v'=0 in the time unit k+1 is reached either from the state v=0 or from the state v=1 in the time unit k. In order to decide which is the more probable of these two previous states, and thus the more probable of the two possible transitions, the sums $oSM_0+BM_k(0\rightarrow 0)$ and $oSM_1+BM_k(1\rightarrow 0)$ are formed (ADD operation). In this case $BM_k(0\rightarrow 0)$ denotes the branch metric value which is associated with the transition from the previous state v=0 to the target state v'=0, and $BM_k(1\rightarrow 0)$ denotes the branch metric value which is associated with the transition from the previous state v=1 to the target state v'=0.

The lesser of the two sum values is determined (COMPARE operation) and becomes the new state metric value $nSM_0$ for the target state v=0 in the time unit k+1, that is to say $nSM_0=\min(oSM_0+BM_k(0\rightarrow 0); oSM_1+BM_k(1\rightarrow 0))$. The associated transition is selected as the more probable of the two possible transitions (SELECT operation). The more probable transition as well as the more probable previous state are determined in this way for each target state v'=0, ..., 15 in the time unit k+1. One ACS operation therefore has to be carried out for each target state.

The two other possible transitions from the previous states v=0, 1 in the time unit k likewise lead to the same target state, to be precise v'=8. The transitions 0→0, 1→0, 0→8, 1→8 are referred to as a butterfly 1 (since they are shaped like a butterfly). A second butterfly—butterfly 2—is defined by the transitions 2→1, 3→1 and 2→9, 3→9. An eighth butterfly is also shown in FIG. 3, and is defined by the transitions 14→7, 14→15 and 15→7, 15→15.

The ACS operations are carried out butterfly-by-butterfly, that is to say in the forward direction. This procedure, which is already known from the prior art, has the advantage that only two old state metric values need be called in order to carry out 2 ACS operations (for example the state metric values $oSM_0$ and $oSM_1$ for the butterfly 1).

The states in the trellis diagram v=0, ..., 15 are defined in a bit-inverted sequence:

State v=0: 0000

State v=1: 1000

State v=2: 0100

...

State v=14: 0111

State v=15: 1111.

As is shown in FIG. 2, the states are formed from the hypotheses for the last 4 bits $a_4, a_3, a_2, a_1$ that are entered in the channel model filter H. The bit $a_5$ that was previously (hypothetically) entered in the channel model filter H is the DF bit for the channel (user channel or interference channel) under consideration, and is not used for the definition of the trellis states for this channel.

Figure 4:
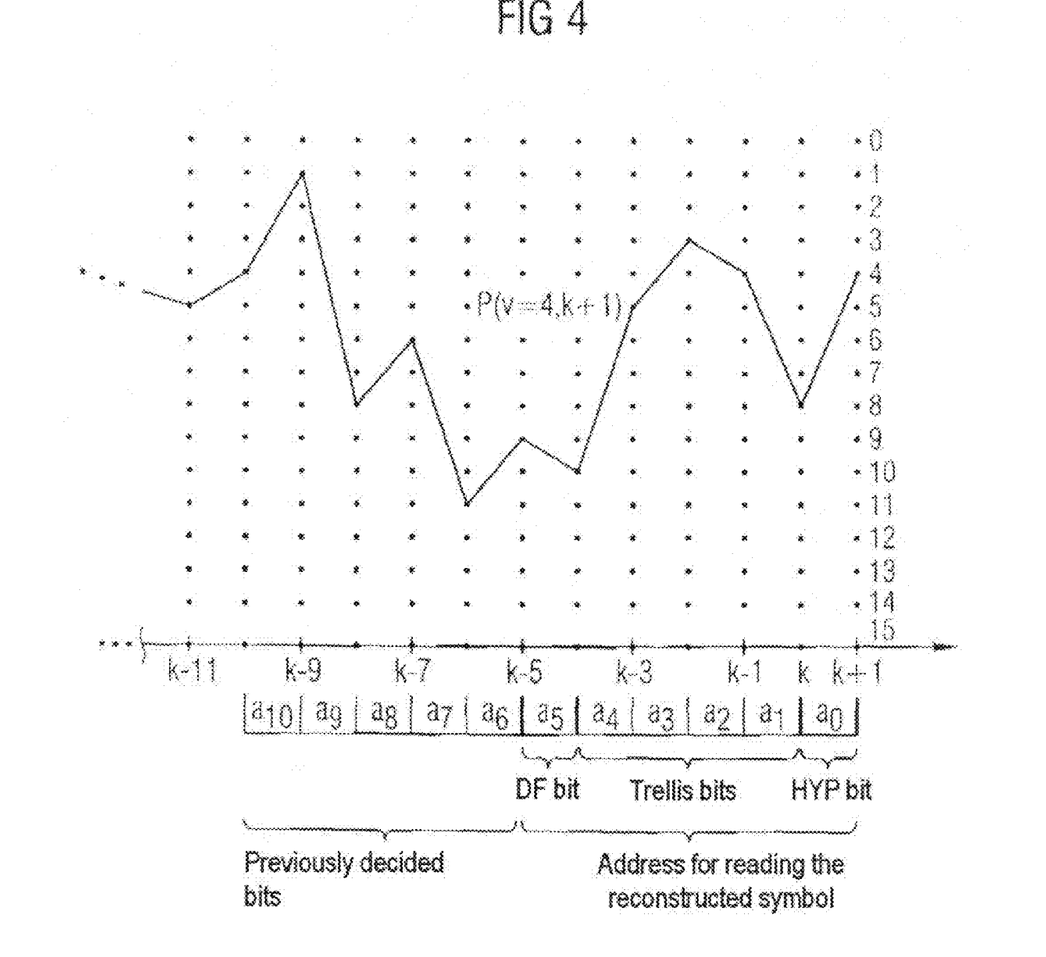
FIG. 4 shows a schematic illustration of a path that leads to a specific state in the time unit k+1 in the trellis diagram, as well as an indication of the associated path vector relating to a channel.

The ACS operations which have been explained with reference to FIG. 3 are processed time unit by time unit, thus resulting in a path being drawn through the trellis diagram for each state v=0, ..., 15. FIG. 4 shows, in abstract form, a path P(v=4, k+1) which leads to the state v=4 in the time unit k+1. The respective hypothetical bits $a_{10}, \ldots, a_5, a_4, a_3, a_2, a_1, a_0$ for the transitions of which the specific path P(v=4, k+1) is composed are shown underneath the trellis diagram.

Since one path leads to each state v=0, ..., 15, there are 16 path vectors with the form indicated above. $(a_{v,10}, \ldots, a_{v,5}, a_{v,4}, a_{v,3}, a_{v,2}, a_{v,1}, a_{v,0})$ is referred to in the following text as the path vector for the path P(v, k+1) which leads to the target state v. The path P(v, k+1) is the path with the minimum overall metric for the time unit k+1, and leads to the state v.

The method according to the invention relates to a specific calculation of the branch metric values $BMU_k(v(k) \to v'(k+1))$ for the user channel, in the following text also referred to for simplicity as $BMU_k(v \to v')$, taking into account the interference channel: as already mentioned, the branch metric values are the Euclidean distances between the sample values and the reconstructed signal values, see equation (2), with the DF bit for the user channel, the trellis bits (for the user channel) and the hypothetical bit (for the user channel) which defines the transition to the target state being included in the calculation of the reconstructed signal values. In addition, according to the invention, there is a DF contribution, which contains information from the interference channel (j=0 or 1):

$$BMU_k = \left| x_k - \left( \underbrace{\sum_{i=5}^{L^I} h_{Ii}(1 - 2 \cdot a_{Ii})}_{\text{DF contribution, interference source}} + \underbrace{\sum_{i=L_{DF}^U+1}^{L^U} h_{Ui}(1 - 2 \cdot a_{Ui})}_{\text{DF contribution, user}} + \underbrace{\sum_{i=1}^{L_{DF}^U} h_{Ui}(1 - 2 \cdot a_{Ui})}_{\text{Trellis contribution, user}} + \underbrace{h_{U0}(1 - 2 \cdot a_{U0})}_{\text{Hyp. symbol contribution, user}} \right) \right|^2 \quad (4)$$

In this case, $h_{Ui}$, i=0, 1, ..., $L^U$ denotes the channel coefficients for the user channel, $h_{Ii}$, i=0, 1, ..., $L^I$ denotes the channel coefficients for the interference channel, $a_{Ui}$ denotes the bits in the user channel, $a_{Ii}$ denotes the bits in the interference channel, $L^U$ is the order of the model filter for the user channel, $L^I$ is the order of the model filter for the interference channel, and $L_{DF}^U$ denotes the number of trellis bits for the user channel. In the example discussed above (equalization of the user channel with 4 trellis bits and one DF bit for the user channel, that is to say $L^U$=5, $L_{DF}^U$=4, and on the assumption that a model filter of order $L^I$=5 is likewise predetermined for the interference channel, this results in (j=0 or 1)

$$BMU_k = \quad (5)$$

$$\left| x_k - \left( \underbrace{\sum_{i=j}^{5} h_{Ii}(1 - 2 \cdot a_{Ii})}_{\text{DF contribution, Interference source}} + \underbrace{\sum_{i=1}^{5} h_{Ui}(1 - 2 \cdot a_{Ui})}_{\text{DF contribution, user and trellis contribution, user}} + \underbrace{h_{U0}(1 - 2 \cdot a_{U0})}_{\text{Hyp. symbol contribution, user}} \right) \right|^2$$

The interference channel can be processed in an analogous manner to the user channel. The specific case ($L^I$=5, $L_{DF}^I$=4) will now be considered instead of the general equation corresponding to equation (4). The branch metrics $BMI_k$ are (j=0 or 1):

$$BMI_k = \quad (6)$$

$$\left| x_k - \left( \underbrace{\sum_{i=j}^{5} h_{Ui}(1 - 2 \cdot a_{Ui})}_{\text{DF contribution, User}} + \underbrace{\sum_{i=1}^{5} h_{Ii}(1 - 2 \cdot a_{Ii})}_{\text{DF contribution, interference source and trellis contribution, interference source}} + \underbrace{h_{I0}(1 - 2 \cdot a_{I0})}_{\text{Hyp. symbol contribution, interference source}} \right) \right|^2$$

The value for j=0 or j=1 is obtained from the selected method for taking account of the interference contribution in the user trellis diagram and the user contribution in the interference trellis diagram. If the interference contribution (user contribution) is based on the processing of the interference trellis diagram (user trellis diagram) in the previous time unit, and if this contribution is used for the first time in the present time unit for reconstruction of a signal value, then the present symbol is not taken into account in the interference contribution (user contribution) (j=1). If, on the other hand, the interference contribution (user contribution) is based on the processing of the interference trellis diagram (user trellis diagram) from the same time unit, this ensures that the present symbol is taken into account in the interference term (user term) (j=0).

The interference contribution (user contribution) in the processing of the user trellis diagram (interference trellis diagram) relating to the time unit k is advantageously indicated as the best path through the interference trellis diagram (user trellis diagram) relating to the time unit k−1 (j=1) or k (j=0).

Figure 5:
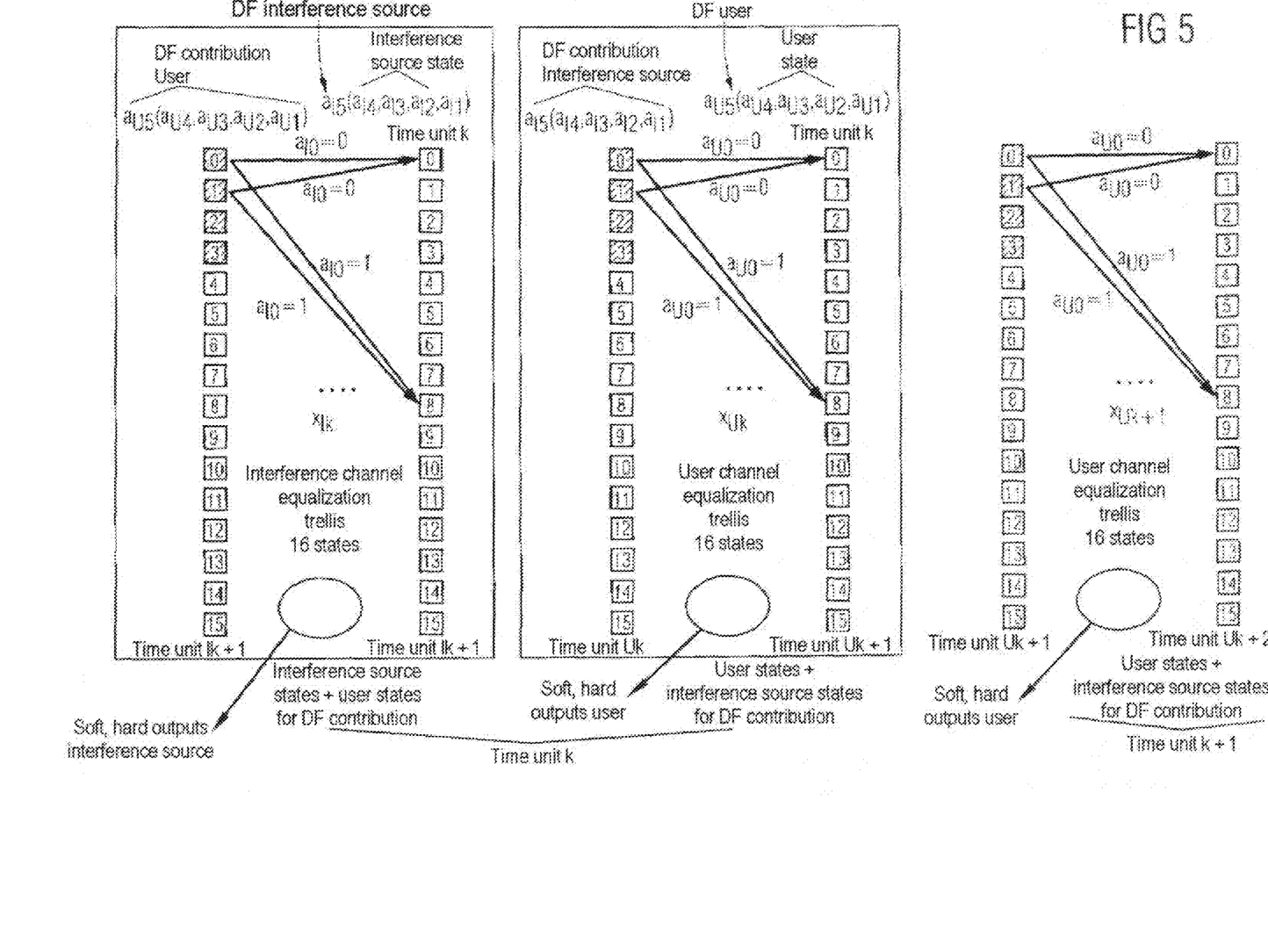
FIG. 5 shows a detail from a trellis diagram for the interference channel and a detail from a trellis diagram for the user channel for the time unit k, as well as a detail from a trellis diagram for the user channel for the time unit k+1, corresponding to FIG. 3, with an indication of the DF bits.

The processing of the two trellis diagrams will be described in the following text with reference to FIG. 5. Two process steps are required for each time unit. First of all, the time unit k will be considered. This analysis is based on the assumption that the interference contribution (user contribution) to the processing of the user trellis diagram (interference trellis diagram) was determined in the previous time unit k−1.

First step: the user channel (16 states) is processed with its own DF bit $a_{U5}$ and 5 DF bits $a_{I1}$, $a_{I2}$, ... , $a_{I5}$ for the interference channel (general case: the user channel is processed with none, one or more of its own DF bits and any desired number of DF bits for the interference channel). The DF bits for the user channel were determined during the processing of the user trellis diagram in the previous time unit.

Second step: the interference channel (16 states) is processed with its own DF bit $a_{I5}$ and 5 DF bits $a_{U1}$, $a_{U2}$, ..., $a_{U5}$ for the user channel (general case: the interference channel is processed with none, one or more of its own DF bits and any desired number of DF bits for the user channel). The DF bits for the interference channel were determined during the processing of the interference trellis diagram in a previous time unit.

The soft and hard output values are derived from the second step (equalization of the user channel using DF bits for the interference channel). Hard output values from the interference channel are derived from the first step (equalization of the interference channel using DF bits for the user channel). Hard output values from both the user channel and the interference channel can be used for further channel estimation (channel tracking; refreshing of the channel coefficients for the user and for the interference source).

The two trellis diagrams are processed in the manner respectively explained with reference to FIG. 3.

The steps 1 and 2 for the processing of two symbols (time units k, k+1) will be explained in detail in the following text:

Processing of a symbol in the time unit k by means of the steps 1 and 2 in the interference channel trellis diagram and the user channel trellis diagram:

At the start of the processing of the two trellis diagrams in the time unit k, the interference channel trellis diagram is initialized using the interference channel training sequence that is known in the receiver (in this case: k=0). This means that the states are coded in binary form from 0 to 15 as shown in FIGS. 3 and 5, with one state necessarily containing the first four bits of the training sequence in the interference channel. This state is the preferred state. In addition, the DF bit or bits for this state (that is to say the interference channel) is or are initialized by means of the corresponding bits from the interference channel training sequence. The DF bits for the other states are set to 0. The preferred state is allocated the smallest state metric (and this state is thus preferred). The other states are allocated a higher default metric.

The trellis diagram for the user channel is initialized in the same way. The preferred state is defined by the training sequence which is transmitted via the user channel, and which is likewise known in the receiver.

The states of the user channel are not taken into account in the state definition in the interference channel trellis diagram. The user channel is included only in the form of the supplementary "cross" DF bits from the user channel in the calculation of the branch metric values for the processing of the interference channel trellis diagram, see FIG. 5 in conjunction with equation (6).

Against the background of this initialization, the states (which are determined solely by the interference channel) of the interference channel trellis diagram are processed for one symbol (time unit k).

The trellis diagram for the user channel is then constructed in the manner already described using the training sequence which is transmitted via the user channel, and this is done in an analogous manner to the construction of the interference channel trellis diagram. This means that the states of the user channel determine solely the trellis diagram for the user channel with one or more DF bits from the user channel. The states for the interference channel are not included in the trellis diagram for the user channel, but are used as additional "cross" DF bits for the calculation of the branch metric values. Against the background of this initialization, the user channel trellis diagram is processed in the normal manner for one symbol (time unit k). After the processing of the two trellis diagrams (that is to say of the interference channel trellis diagram and of the user channel trellis diagram) for one symbol, the best path through the interference channel trellis diagram and the best path through the user channel trellis diagram are determined, with whose aid the hard output values are determined for the interference channel and for the user channel.

The path in the interference channel and the path in the user channel are updated only with the states or the DF bits for the interference channel or user channel, respectively. State paths for the respective other channel are not used.

Processing of the next symbol in the time unit k+1 by means of the steps 1 and 2 in the interference channel trellis diagram and the user channel trellis diagram:

During the processing of the next symbol in the interference channel and user channel trellis diagrams, the respective "cross" DF bits, that is to say the user channel DF bits for the interference channel and the interference channel DF bits for the user channel, are updated on the basis of the results obtained during the processing of the previous symbol. In other words, the "cross" DF bits in the user channel receive the update from the previous processing of the user channel trellis diagram in the interference channel. The interference channel's "own" DF bits receive the update from the previous processing of the interference channel trellis diagram.

The trellis diagram for the user channel is processed in an analogous manner: in the user channel trellis diagram, the "cross" DF bits for the interference channel receive the update from the previous processing of the interference channel trellis diagram. The user channel's "own" DF bits receive the update from the previous processing of the user channel trellis diagram.

In the example that has been discussed, it is evident that the DF contribution for the user channel (interference channel) for the processing of the interference trellis diagram (user trellis diagram) was determined in the previous time step by the processing of the user trellis diagram (interference trellis diagram). The present user symbol (interference symbol) is thus not taken into account in the DF contribution. However, the present DF contribution for the interference channel can be used in a simple manner for the processing of the user trellis diagram in the same time unit k, in FIG. 5. Only the DF contribution for the user channel for the processing of the interference trellis diagram thus originates from the previous time unit k−1.

The calculations of the branch metric values $BMU_k$ can be carried out in the normal manner with the aid of the filtered received data $x_{Uk}$ (filtered by the initial filter in the user channel) and $x_{Ik}$ (filtered by the initial filter in the interference channel) and the channel coefficients $h_{Ui}$ for the user channel and the channel coefficients $h_{Ii}$ for the interference channel.

Figure 6:
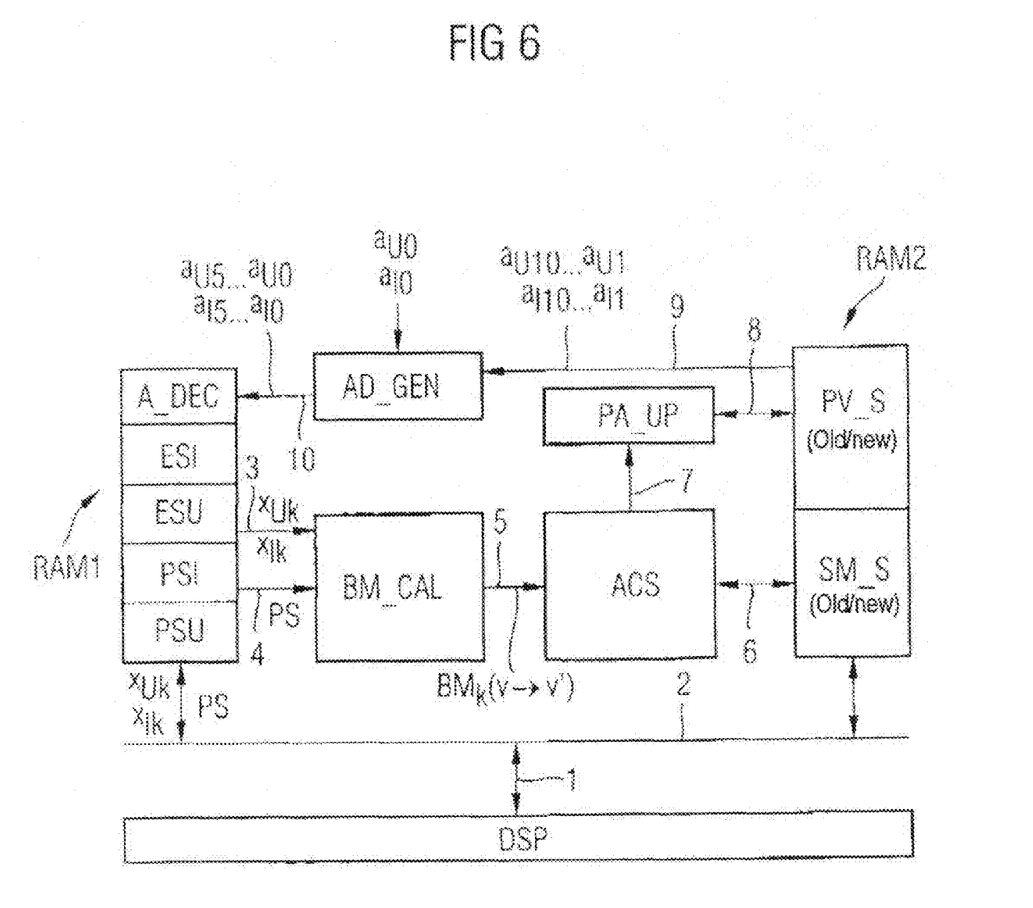
FIG. 6 shows a block diagram of the architecture of one implementation of a Viterbi equalizer according to the invention.

FIG. 6 shows the architecture of a Viterbi equalizer circuit according to the present invention.

This figure shows only the relevant modules that are necessary for taking into account the interference channel in the equalization of a user channel. Modules (for example soft output and hard output calculation units) that are a component of a conventional equalizer (see German Patent Application DE 103 03 954 which is hereby incorporated by reference in its entirety) are not discussed here.

The circuit comprises a DSP, which is connected to a data bus 2 via a data link 1. A first data memory RAM1 has four memory areas ESU, ESI and PSU, PSI. The first memory area ESU is used to store received data symbols (sample values) $x_{Uk}$ which are filtered by the initial filter in the user channel, the second memory area ESI is used for storing the received data symbols (sample values) $x_{Ik}$ which have been filtered by the initial filter in the interference channel, the third memory area PSU is used for storing partial sums of products of channel parameters and bits from the user channel, and the fourth memory area PSI is used for storing partial sums of products of channel parameters and bits from the interference channel. An address decoder A_DEC is used for driving the first and second memory areas ESU, ESI as well as the third and fourth memory areas PSU, PSI. Furthermore, the equalizer circuit has a circuit section BM_CAL for calculating the branch metric values, a circuit section ACS for carrying out the ACS operations, a circuit section PA_UP for calculating updated path vectors, and an address generator AD_GEN for driving the address decoder A_DEC. The circuit has a second data memory RAM2, which has two memory areas PV_S and SM_S. Old and new path vectors for the user channel and for the interference channel are stored in the first memory area PV_S. The old and new state metric values for the user channel and for the interference channel are located in the second memory area SM_S.

A dedicated memory is provided for the hard and soft outputs of the user channel and the hard outputs of the interference channel, and can be read by the DSP. This memory is not shown in FIG. 6.

The DSP carries out channel estimations at regular time intervals, then calculates the 64 partial sums (PS)

$$\sum_{i=1}^{5} h_{Ui}(1 - 2 \cdot a_{Ui,j}),$$

$j=0, \ldots, 63$, for the user channel and the 64 partial sums (PS)

$$\sum_{i=1}^{5} h_{Ii}(1 - 2 \cdot a_{Ii,j}),$$

$j=0, \ldots, 63$ for the interference channel (j covers all the possible combinations of 6 two-value symbols), and writes these to the third and fourth memory areas PSU, PSI in the data memory RAM1.

The filtered sample values $x_{Uk}$, $x_{Ik}$ are entered in the first and second memory areas ESU, ESI. The circuit section BM_CAL is connected via a data link 3 to the first and second memory areas ESU, ESI, and receives the partial sums via a data link 4. On the output side, the circuit section BM_CAL signals the calculated branch metric values to the circuit section ACS via a data link 5. The circuit section ACS carries out the trellis processing (as explained with reference to FIGS. 3 and 5) for the two channels butterfly-by-butterfly. For this purpose, the circuit section ACS receives two old state metric values (oSM$_0$, oSM$_1$ either for the user channel or for the interference channel) via the bidirectional data link 6 for the processing of the butterfly 1, receives the required branch metric values BMU$_k$ (0→0), BMU$_k$ (1→0) and BMU$_k$ (0→8) and BMU$_k$ (1→8) for the user channel and, respectively BMI$_k$ (0→0), BMI$_k$ (1→0) and BMI$_k$ (0→8) and BMI$_k$ (1→8) for the interference channel via the data link 5, and calculates two new state metric values nSM$_0$ and nSM$_8$—either for the user channel or for the interference channel. The new state metric values are written to the memory area SM_S via the data link 6.

The circuit section ACS makes the SELECT decision for each target state in the time unit k+1. This decision is signaled to the circuit section PA_UP via the data link 7. The circuit section PA_UP then updates the path vector for the target state under consideration, for example v=0, by the path section for the previous state, which was selected during the ACS operation, and the hypothetical symbol $a_{U0}$ or $a_{I0}$. For this purpose, the circuit section PA_UP is connected, in order to interchange data, via a data link 8 to the first memory area PV_S in the second data memory RAM2.

The address generator AD_GEN uses a data link 9 to call the path vectors $(a_{U10}, \ldots, a_{U1})$ and $(a_{I10}, \ldots, a_{I1})$ relating to the previous states, and uses them to generate two addresses $a_{U5}, a_{U4}, a_{U3}, a_{U2}, a_{U0}$ and $a_{I5}, a_{I4}, a_{I3}, a_{I2}, a_{I1}, a_{I0}$ from them and from a hypothesis for the hypothetical symbol $a_{U0}$ (or $a_{I0}$) for the transition k→k+1 for the address decoder A_DEC for the third and fourth memory areas PSU, PSI in RAM1. The address decoder A_DEC is driven by the address generator AD_GEN via the data link 10.

Figure 7:
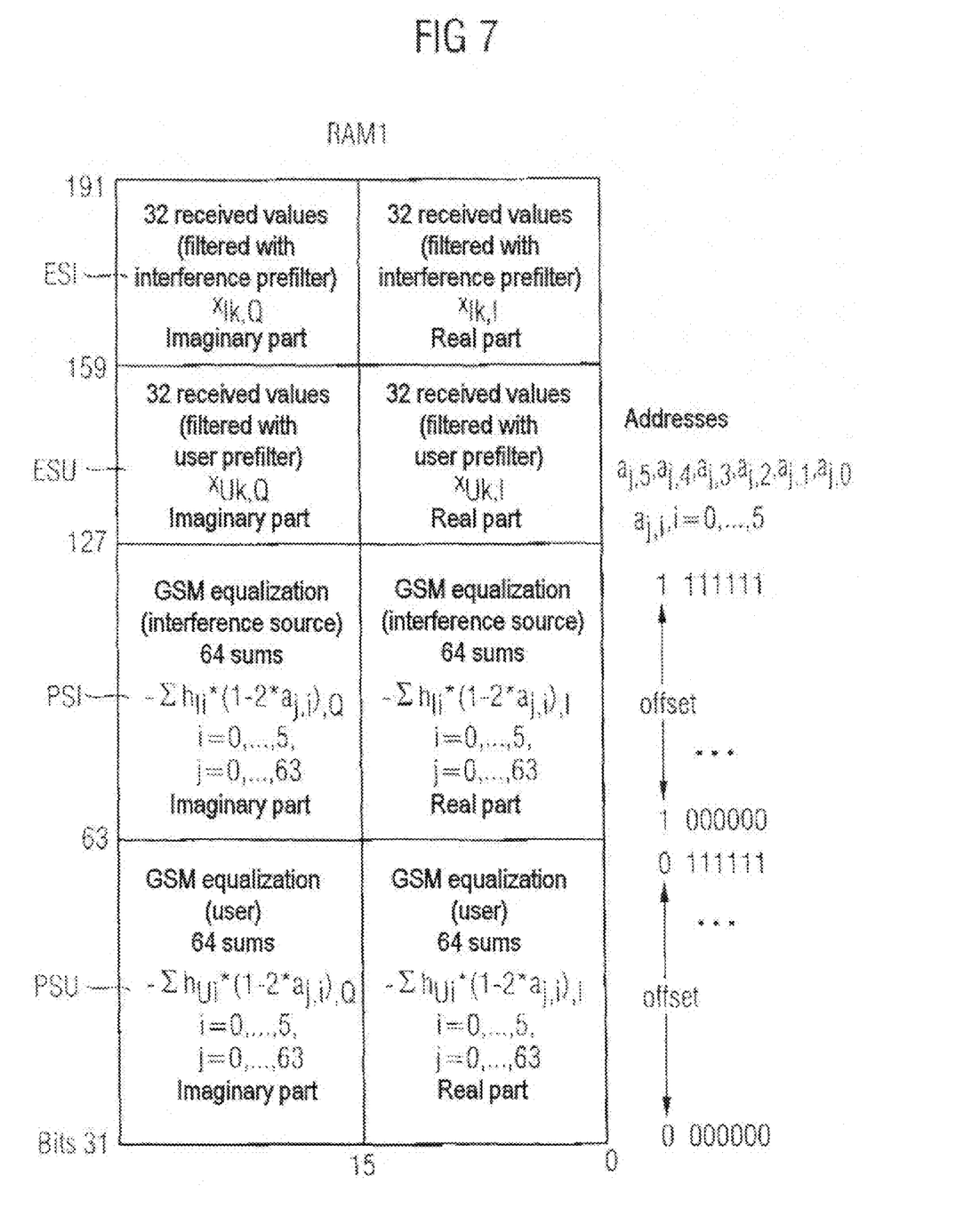
FIG. 7 shows a schematic illustration of the partitioning of a memory for the received, filtered signal values and the partial sums of the branch metric values.

FIG. 7 shows the memory contents of the first data memory RAM1. The memory areas PSU, PSI for the partial sums are defined by the 2×64 addresses 0, 0, 0, 0, 0, 0, 0 . . . , 0, 1, 1, 1, 1, 1, 1, 1, 0, 0, 0, 0, 0 . . . , 1, 1, 1, 1, 1, 1, 1. The real part and the imaginary part, respectively, of one of the 64 partial sums $$\sum_{i=1}^{5} h_{Ui}(1 - 2 \cdot a_{Ui,j})$$

from the user channel is available at the addresses 0, 0, 0, 0, 0, 0, 0 to 0, 1, 1, 1, 1, 1, 1, and the real part and the imaginary part, respectively, of one of the 64 partial sums $$\sum_{i=1}^{5} h_{Ii}(1 - 2 \cdot a_{Ii,j})$$

from the interference channel is available at the addresses 1, 0, 0, 0, 0, 0, 0 to 1, 1, 1, 1, 1, 1, 1. The word length of the memory RAM1 is, for example, 32 bits. For example, 32 received data symbols $x_{Ik}$ and $x_{Uk}$, respectively, are stored in the first two memory areas ESI and ESU. In this case, a channel estimation may be carried out, for example, every 32 time units, so that the first data memory RAM1 is formed with new received symbols $x_{Ik}$, $x_{Uk}$ and with new partial sums by the DSP every 32 time units.

Figure 8:
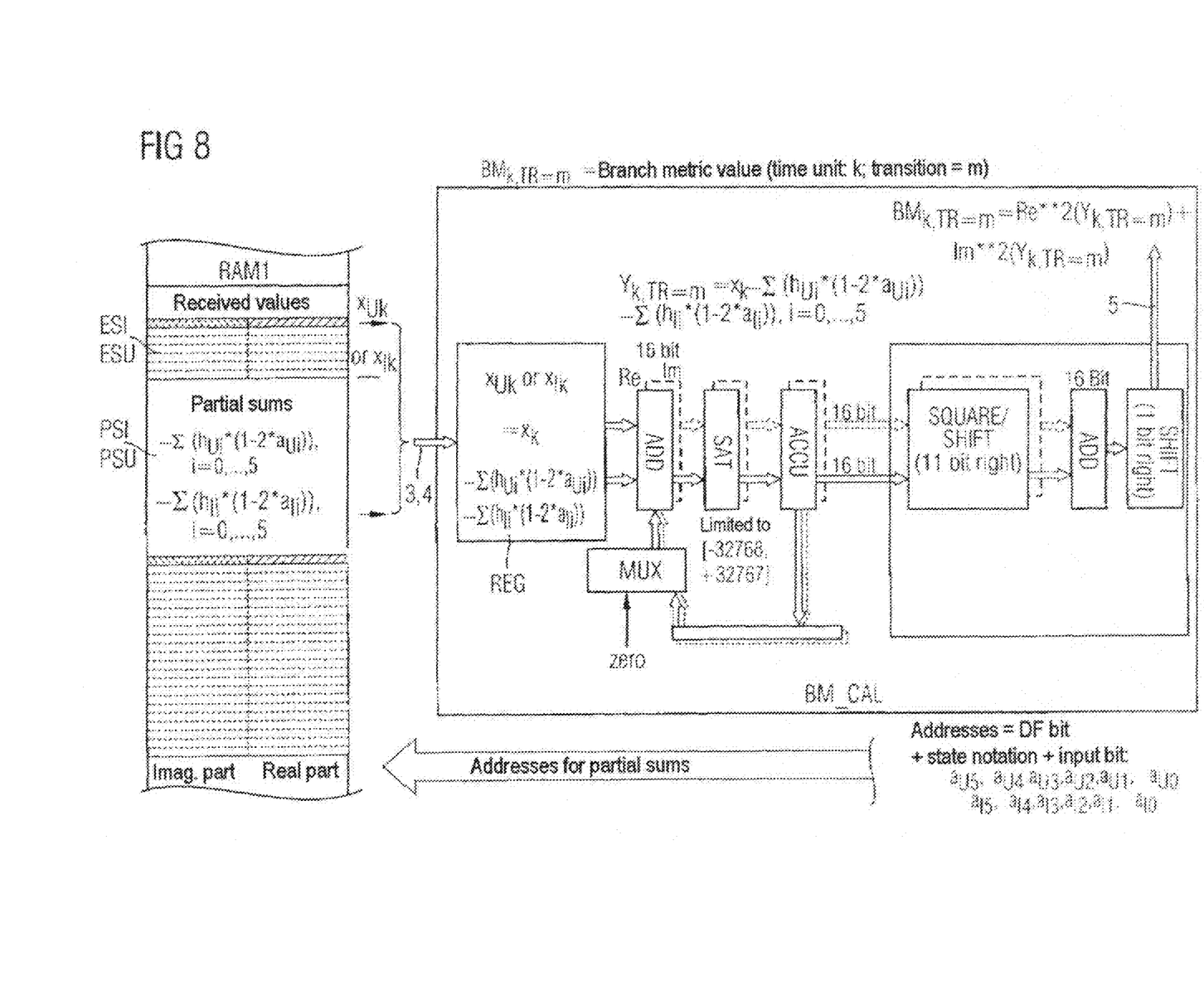
FIG. 8 shows a circuit diagram of the unit for calculation of the branch metric values from FIG. 6.

FIG. 8 shows the configuration of the circuit section BM_CAL. A register REG receives the imaginary and real parts of a received symbol $x_k=x_{Uk}$ or $x_{Ik}$ for the present time unit k, and the partial sums, addressed via the address generator AD_GEN for the user channel and the interference channel for a specific branch. A partial sum and the received symbol $x_k$ are added in a complex adder ADD. The real part and the imaginary part are restricted to the value range [−32768, +32767], that is to say to a word length of 16 bits, by way of example, in a saturation state SAT. The other partial sum is added by means of an accumulator ACCU. The real part and the imaginary part of the result are passed to a square and shift element SQUARE/SHIFT. The shift element produces a shift through 11 bits to the byte after the squaring process, so that a signal word with the length of 16 bits (bits 27 to 11 of the square values) is obtained. A further adder ADD adds the squares of the real part and imaginary part. The branch metric value $BMU_k(v \to v')$ or $BMI_k(v \to v')$ is output via the data link 5 with a word length of 16 bits by means of a further shift stage SHIFT, which shifts the addition result through one bit to the right.

The invention claimed is:

1. A method for equalization of a signal of a user utilizing an equalizer, wherein the signal is transmitted via a user channel using a decision feedback (DF) method, and taking into account an interference signal which is transmitted via an interference channel, comprising:
processing a trellis diagram for the user channel, with a DF contribution that is used in the trellis diagram processing containing information about the interference channel;
wherein the signal of the user is equalized in the equalizer based on the interference signal.

2. The method according to claim 1, wherein the information about the interference channel within the DF contribution comprises a product of a symbol and a channel parameter of the interference channel, or is a sum of said products.

3. The method according to claim 1, wherein the DF contribution also contains information about the user channel.

4. The method according to claim 1, further comprising processing a trellis diagram for the interference channel in order to calculate the information about the interference channel for the DF contribution for processing the trellis diagram for the user channel.

5. The method according to claim 4, further comprising using a DF contribution that contains information about the user channel in the processing of the trellis diagram for the interference channel.

6. The method according to claim 1, wherein the information about the interference channel comprises a best path through the trellis diagram for the interference channel relating to a relevant time unit.

7. The method according to claim 3, wherein the information about the user channel comprises a best path through the trellis diagram for the user channel relating to a relevant time unit.

8. The method according to claim 7, wherein processing the trellis diagram for the interference channel and using the interference channel information for the user channel trellis diagram processing comprises:
processing of a time unit in the trellis diagram for the interference channel by calculation of branch metric values and state metric values using a Viterbi algorithm;
updating interference channel path information which is associated with the trellis states for the interference channel;
calculating the information about the interference channel from the updated interference channel path information; and
processing of a time unit in the trellis diagram for the user channel by calculation of branch metric values and state metric values of the user channel taking into account the DF contribution, which contains the information about the interference channel, using a Viterbi algorithm.

9. The method according to claim 8, further comprising:
updating the user channel path information which is associated with the trellis states of the user channel;
calculating the information about the user channel from the updated user channel path information; and
processing of a time unit in the trellis diagram for the interference channel by calculation of branch metric values and state metric values of the interference channel taking into account the DF contribution, which contains the information about the user channel, using the Viterbi algorithm.

10. A decision feedback (DF) equalizer configured for equalization of a signal of a user channel using a DF method, comprising:
a hardware calculation circuit configured to calculate branch metric values and to take into account DE contributions, wherein the DF contributions comprise information about an interference signal which is transmitted via an interference channel, and
a trellis processing circuit coupled to an output of the hardware calculation circuit and configured to receive the calculated branch metric values, wherein the trellis processing circuit is further configured to process a trellis diagram for the user channel based on the calculated branch metric values.

11. The DF equalizer according to claim 10, wherein the trellis processing circuit is further configured to process trellis diagrams for the interference channel based on the calculated branch metric values.

12. A method for equalization of a received signal of a user transmitted over a user channel utilizing an equalizer, comprising:
establishing a trellis diagram for the user channel using a decision feedback (DF) method in accordance with a Viterbi algorithm;
calculating a branch metric for each possible state transition in the user channel trellis diagram, wherein each branch metric comprises a trellis contribution and a DF contribution, and wherein calculating the DF contribution of the branch metric for the user channel employs information associated with an interference signal transmitted via an interference channel; and
identifying path vectors through the user channel trellis diagram that lead to each state based on a minimum state metric value, wherein state metric values are calculated using the branch metric values of the user channel trellis diagram;
wherein the received signal of the user is equalized in the equalizer according to the interference signal information.

13. The method according to claim 1, wherein the signal of the user comprises a stream of user symbols transmitted by the user and the interference signal comprises a stream of interference symbols transmitted by the interference channel.

14. The DF equalizer according to claim 10, further comprising:
a user pre-filter configured to output the signal of the user comprising a stream of the user symbols, and
an interference pre-filter configured to output the interference signal comprising a stream of the interference symbols.

* * * * *